United States Patent
Harris et al.

(10) Patent No.: US 11,232,028 B2
(45) Date of Patent: *Jan. 25, 2022

(54) ERROR-CHECKING IN NAMESPACES ON STORAGE DEVICES

(71) Applicant: Micron Technology, Inc., Boise, ID (US)

(72) Inventors: Byron D. Harris, Mead, CO (US); Karl D. Schuh, Santa Cruz, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,706

(22) Filed: May 15, 2020

(65) Prior Publication Data

US 2020/0278927 A1 Sep. 3, 2020

Related U.S. Application Data

(63) Continuation of application No. 16/175,559, filed on Oct. 30, 2018, now Pat. No. 10,691,592.

(51) Int. Cl.
*G06F 12/02* (2006.01)
*G06F 3/06* (2006.01)

(52) U.S. Cl.
CPC ........ *G06F 12/0292* (2013.01); *G06F 3/0619* (2013.01); *G06F 3/0659* (2013.01); *G06F 3/0673* (2013.01)

(58) Field of Classification Search
None
See application file for complete search history.

(56) References Cited

U.S. PATENT DOCUMENTS 8,738,621 B2    5/2014   Hinrichs
10,691,592 B2 *   6/2020   Harris ................. G06F 12/1009
(Continued)

FOREIGN PATENT DOCUMENTS

| CN | 102576333 A | 7/2012 |
| CN | 106575271 A | 4/2017 |
| EP | 3121718 B1 | 8/2018 |

OTHER PUBLICATIONS

International Search Report and Written Opinion, PCT App. No PCT/US2019/056607, dated Feb. 6, 2020, 9 pages.
(Continued)

*Primary Examiner* — Charles Rones
*Assistant Examiner* — Ryan Dare
(74) *Attorney, Agent, or Firm* — Nicholson De Vos Webster & Elliott LLP (57) ABSTRACT

Systems and methods for storing and validating namespace metadata are disclosed. An exemplary system includes a memory component and a processing device receiving a first read instruction from a host process. The first read instruction includes a namespace offset. A first logical address is generated by combining a namespace identifier for the namespace assigned to the host process and the namespace offset. The first logical address is translated into a first physical address using a plurality of hierarchical tables. A second read instruction, which includes the first physical address and the first logical address, is generated. The second read instruction is sent to a memory component. The memory component validates the translation of the first logical address by comparing the first logical address in the second read instruction to metadata associated with data to be read at the first physical address.

20 Claims, 8 Drawing Sheets

(56) References Cited

U.S. PATENT DOCUMENTS

| | | |
|---|---|---|
| 2016/0342463 A1 | 11/2016 | Oshima |
| 2017/0242722 A1 | 8/2017 | Qiu et al. |
| 2017/0351431 A1 | 12/2017 | Dewitt et al. |
| 2018/0121344 A1 | 5/2018 | Seo et al. |
| 2018/0225198 A1 | 8/2018 | Kanno et al. |
| 2018/0239697 A1 | 8/2018 | Huang et al. |
| 2018/0260334 A1 | 9/2018 | Asano et al. |
| 2019/0146927 A1 | 5/2019 | Frolikov |
| 2020/0045125 A1 | 2/2020 | Glimcher et al. |
| 2020/0133849 A1* | 4/2020 | Harris .................. G06F 3/0679 |

OTHER PUBLICATIONS

Non-Final Office Action, U.S. Appl. No. 16/175,559, dated Nov. 18, 2019, 17 pages.

Notice of Allowance, U.S. Appl. No. 16/175,559, dated Mar. 5, 2020, 10 pages.

First Office Action and Search Report, CN App No. 201980067659.X, dated Sep. 3, 2021, 18 pages (10 pages of English Translation and 8 pages of Original Document).

* cited by examiner

ERROR-CHECKING IN NAMESPACES ON STORAGE DEVICES

This application is a continuation of U.S. patent application Ser. No. 16/175,559, filed Oct. 30, 2018 (now U.S. Pat. No. 10,691,592), which is hereby incorporated by reference.

TECHNICAL FIELD

The present disclosure generally relates to namespaces on storage devices, and more specifically, relates to implementing error-checking in namespaces.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data in the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to using namespaces in a memory subsystem. A namespace can be a contiguous range of logical block addresses assigned to one or more systems or processes. A namespace can be identified by a namespace identifier. A memory subsystem is also hereinafter referred to as a "memory device". An example of a memory subsystem is a storage system, such as a solid-state drive (SSD). In some embodiments, the memory subsystem is a hybrid memory/storage subsystem. In general, a host system can utilize a memory subsystem that includes one or more memory components. The host system can provide data to be stored in the memory subsystem and can request data to be retrieved from the memory subsystem.

Conventional approaches to allocating storage on a storage system provide a single logical address space to the host system for storing data and accessing data. This is inefficient if multiple host processes are assigned different portions of the logical address space because the assigned regions cannot be efficiently deleted, and new regions assigned, because each logical block address is independent of every other logical block address. Accordingly, logical blocks in use by a process cannot be released efficiently, because there is no common definition of all of the logical block addresses in use by the process.

The above and other deficiencies are addressed by dividing the storage system into namespaces that can be assigned to different host systems or host processes. Physical addresses in memory components associated with each namespace address are error checked using a namespace identifier and the namespace address, which allows namespaces to be deleted and created without disrupting the error checking as would occur in a conventional system. Error-checking is preserved by storing a namespace identifier and an offset into the logical address space of a namespace as metadata. Accordingly, using the namespace information as metadata maintains error-checking capabilities and provides the benefit of managing storage using namespaces.

Figure 1:
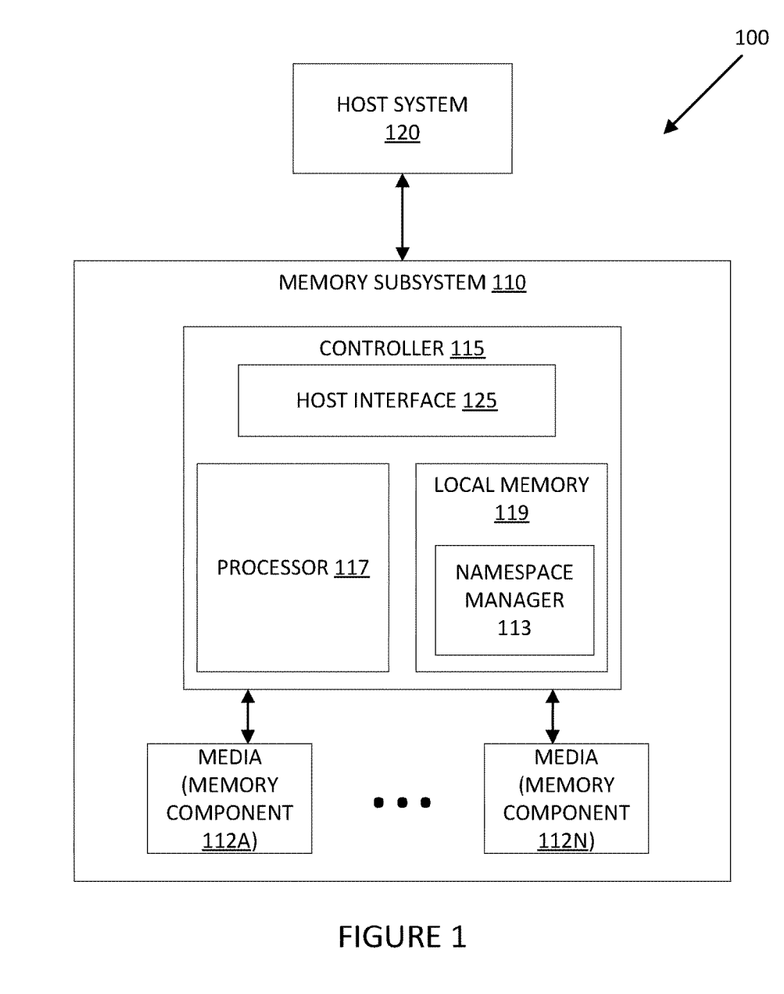
FIG. 1 illustrates an example computing environment that includes a memory subsystem in accordance with some embodiments of the present disclosure.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110. In one embodiment, memory components 112A to 112N include a reserved portion (not illustrated) of memory where metadata is stored, such as for error-checking metadata described in more detail elsewhere in this disclosure.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached Small Computer Systems Interface (SCSI) (i.e., Serial Attached SCSI (SAS)), etc. The physical host interface can be used to transmit data between the host system 120 and the memory subsystem 110. The host system 120 can further utilize an Non-Volatile Memory (NVM) Express (NVMe) interface to access the memory components 112A to 112N when the memory subsystem 110 is coupled with the host system 120 by a PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto-resistive random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller 115") can communicate with the memory components 112A to 112N to perform operations such as reading data, writing data, or erasing data in the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry 125 to communicate with the host system 120 via the physical host interface. The host interface circuitry 125 can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a namespace manager 113 that can divide storage on the storage system into namespaces. In some embodiments, the controller 115 includes at least a portion of the namespace manager 113, e.g., stored in local memory 119. For example, the controller 115 can include a processor 117 (processing device) configured to execute instructions stored in local memory 119 for performing the operations described herein. In some embodiments, the namespace manager 113 is part of the host system 110, an application, or an operating system.

The namespace manager 113 can divide storage on the storage system into multiple namespaces, or contiguous logical block address ranges. Further details with regards to the operations of the namespace manager 113 are described elsewhere in this disclosure.

Figure 2:
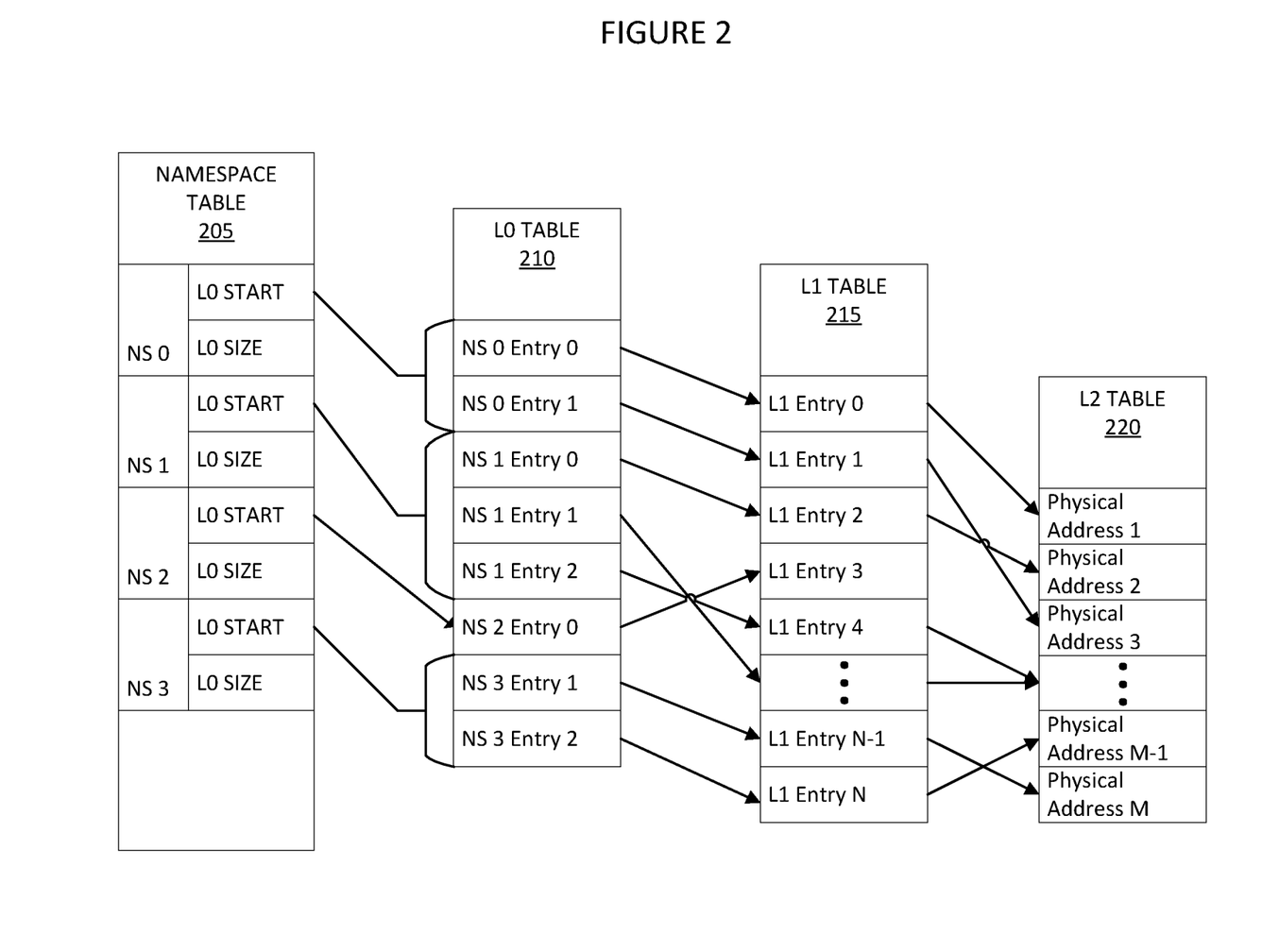
FIG. 2 illustrates an example of hierarchical tables including a namespace table in accordance with some embodiments of the present disclosure.

FIG. 2 illustrates an example of hierarchical tables including a namespace table 205 in accordance with some embodiments of the present disclosure. Logical addresses are translated into physical addresses using translation tables 205, 210, 215, and 220. For example, a flash translation layer (FTL), namespace manager 113, or another process executed by controller 115 can use tables 205, 210, 215, and 220 to map logical addresses provided by host system 120 to physical addresses within memory components 112. Namespace table 205 includes an entry for each namespace that currently exists on the storage device. In this example, the storage device includes four namespaces: NS 0, NS 1, NS 2, and NS 3. In one embodiment, each entry in the namespace table 205 includes a starting location in or otherwise maps to the next table in the hierarchy of tables: L0 Table 210. In this embodiment, each entry also includes a size value defining how many entries in the L0 table are assigned to a namespace. As can be seen in FIG. 2, NS 0 starts at the beginning of L0 Table 210 and includes two entries in the L0 table. In some embodiments, namespace entries in L0 Table 210 are stored consecutively. Namespace entries in L0 Table 210 can include a pointer to an entry in L1 Table 215. In one embodiment, namespace entries in L0 Table 210 are not assigned a pointer into L1 Table 215 until needed to store data. Entries in L1 Table 215 point to entries in L2 Table 220. Entries in L2 Table 220 include actual physical addresses in the storage device, such as memory components 112A-112N. In one embodiment, consecutive entries in L0 Table 210 point to non-consecutive entries in L1 Table 215. In one embodiment, deleting a namespace includes removing the corresponding namespace entry in namespace table 205 and removing the entries corresponding to that namespace in the L0 table 210. Remaining entries in namespace table 205 and L0 table 210 are moved up in the tables (e.g., copied from one memory location to another). In one embodiment, tables 205 and 210 are stored in local memory 119. In another embodiment, tables 205 and 210 are stored in memory tightly-coupled to processor 117 to improve performance. In one embodiment, tables 205 and 210 act as a layer of abstraction between the address space defined within a namespace that is used by the host process as a logical address space and the logical address space used by the memory subsystem 110. Because the logical address space of the memory subsystem 110 includes all the defined namespaces, the memory subsystem 110 uses logical block addresses that include the namespace identifier and the namespace offset.

Figure 3:
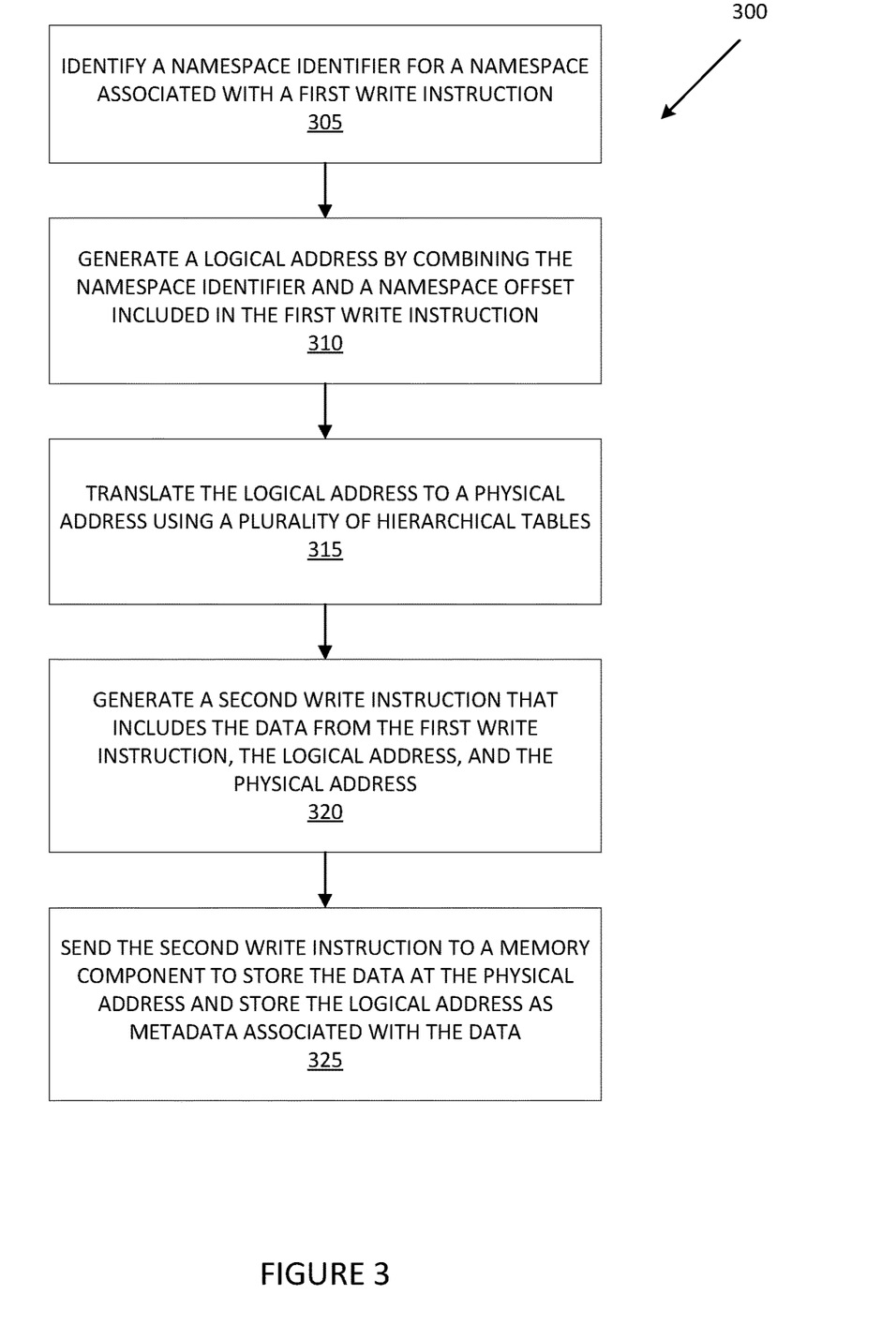
FIG. 3 is a flow diagram of an example method of storing namespace metadata in accordance with some embodiments of the present disclosure.

FIG. 3 is a flow diagram of an example method 300 to store namespace metadata, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by namespace manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 305, the processing device identifies a namespace identifier for a namespace associated with a first write instruction. For example, the write instruction can include a namespace identifier or another indication of a namespace. In one embodiment, the namespace identifier is 'NS 0' in namespace table 205. In one embodiment, the first write instruction is received from host system 120 or a host process executing on host system 120 or communicating with memory subsystem 110 through host system 120. The first write instruction includes data to be stored in memory subsystem 110, such as within memory components 112A-112N. The first write instruction can also include an offset within a namespace (i.e., a namespace offset) assigned to the host process that indicates where in the namespace's logical address space the data is to be written.

At block 310, the processing device generates a logical address by combining the namespace identifier and the namespace offset included in the write instruction. In one embodiment, the processing device generates the logical address by appending the namespace offset to the namespace identifier.

At block 315, the processing device translates the logical address to a physical address using a plurality of hierarchical tables. In one embodiment, the processing device uses tables 205, 210, 215, and 220 to translate the logical address into a physical address. The physical address corresponds to a memory address within memory components 112A-112N. In one embodiment, the translation of the logical address includes entries in the hierarchical tables with consecutive portions of the logical address. For example, the namespace identifier portion of the logical address identifies an entry in the namespace table (e.g., table 205). The processing device can use consecutive portions of the namespace offset to select entries in tables 210, 215, and 220 relative to the pointers identified in the preceding table in the hierarchy. When an entry in the last table in the hierarchy is reached (e.g., table 220), the selected entry includes the physical address corresponding to the logical address. For example, the processing device can use the tables in FIG. 2 to translate a namespace identifier and a namespace offset into a physical address in a memory component (e.g., memory components 112A-112N). In this example, the processing device looks up the namespace identifier in namespace table 205. The entry for that namespace includes the starting location and size of the entries for that namespace in table 210, which in turn points to the corresponding entry in table 215, which in turn points to an entry in table 220, the contents of which is the physical address corresponding to the logical block address composed of the namespace identifier and namespace offset.

At block 320, the processing device generates a second write instruction that includes the data from the first write instruction, the logical address, and the physical address. In one embodiment, the second write instruction is in a format required by the memory component. In another embodiment, the second write instruction is the first write instruction after the processing device updates the first write instruction to include the full logical address and the physical address.

At block 325, the processing device sends the second write instruction to a memory component (e.g., memory components 112A-112N) to store the data at the physical address. The second write instruction also causes the logical address to be stored as metadata associated with the data in an area of the memory component associated with the physical address.

Figure 4:
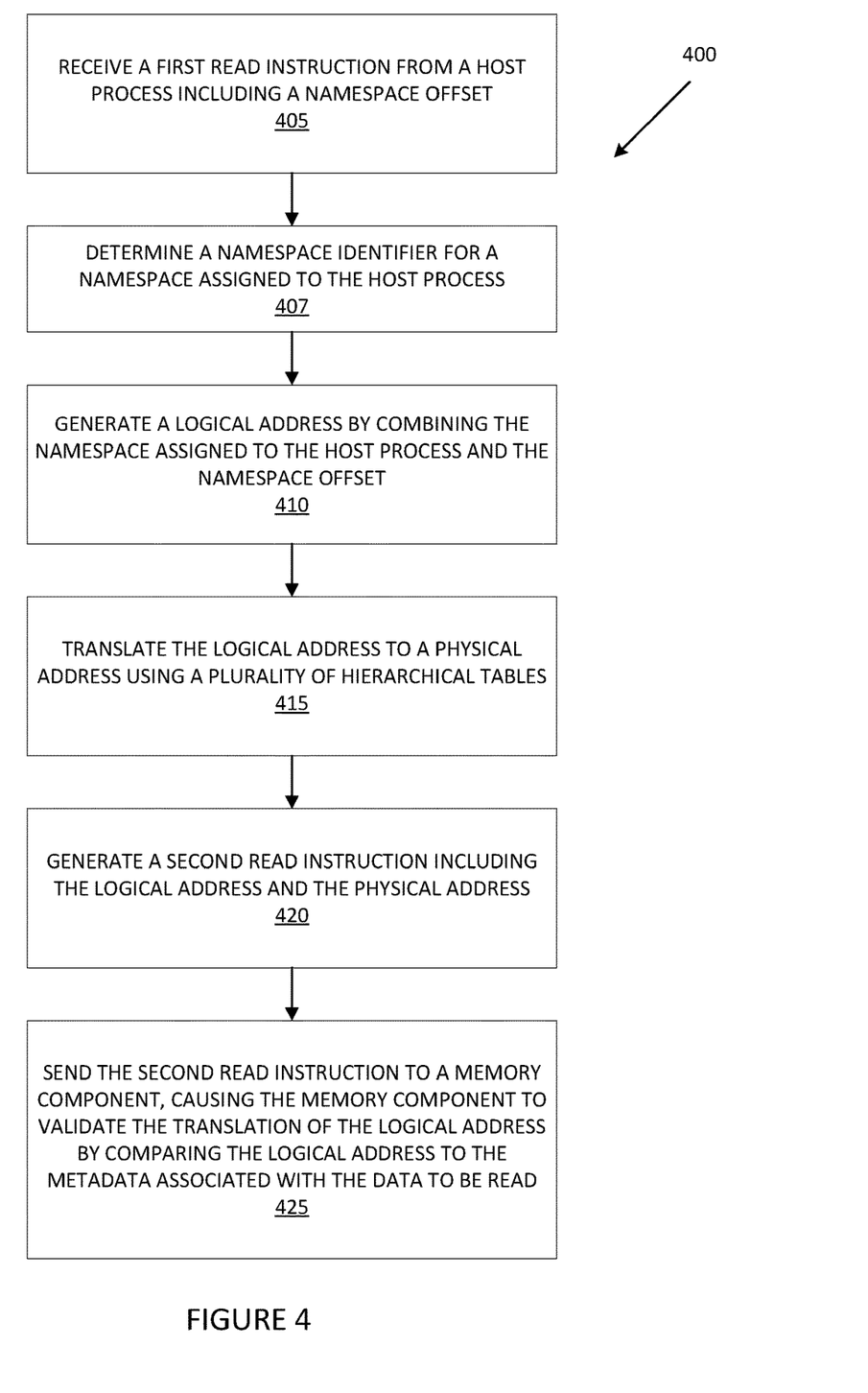
FIG. 4 is a flow diagram of an example method of validating namespace metadata in accordance with some embodiments of the present disclosure.

FIG. 4 is a flow diagram of an example method of validating namespace metadata in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by namespace manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 405, the processing device receives a first read instruction from a host process, the instruction including a namespace offset and, optionally, a namespace identifier. In one embodiment, the host process is executing on host system 120. In one embodiment, the host process is a virtual machine or an application running on a virtual machine. The namespace offset indicates a logical location in the namespace assigned to host system or host process to read data.

At block 407, the processing device identifies or otherwise determines a namespace identifier for the namespace assigned to the host process. In one embodiment, the host process includes the namespace identifier in the read instruction, while in other embodiments the processing device looks up the host process in a lookup table (not illustrated; can be stored in local memory 119) and reads the namespace identifier assigned to the host process from the lookup table. At block 410, the processing device generates a logical address by combining the namespace identifier assigned to the host process and the namespace offset.

At block 415, the processing device translates the logical address to a physical address using a plurality of hierarchical tables. In one embodiment, the processing device performs the translation in a similar manner as described in relation to block 315 elsewhere in this disclosure.

At block 420, the processing device generates a second read instruction including the logical address and the physical address. In one embodiment, the second read instruction is in a format required by the memory component. In another embodiment, the second read instruction is the first read instruction after the processing device updates the first read instruction to include the full logical address and the physical address.

At block 425, the processing device sends the second read instruction to a memory component (e.g., memory components 112A-112N), causing the memory component to validate the translation of the logical address by comparing the logical address included in the second read instruction to the logical address stored in the metadata associated with the data stored at the physical address. In one embodiment, the memory component includes error checking logic that compares the two addresses. In another embodiment, controller 115 performs the comparison using processor 117. In yet another embodiment, host interface 125 performs the comparison as a part of an end-to-end data protection scheme. If the two logical addresses are the same, then the namespace offset provided by the host process has been associated with the correct namespace identifier (block 407) and correctly translated (block 415). The processing device can read the data at the physical address and return it to the host process.

Figure 5A:
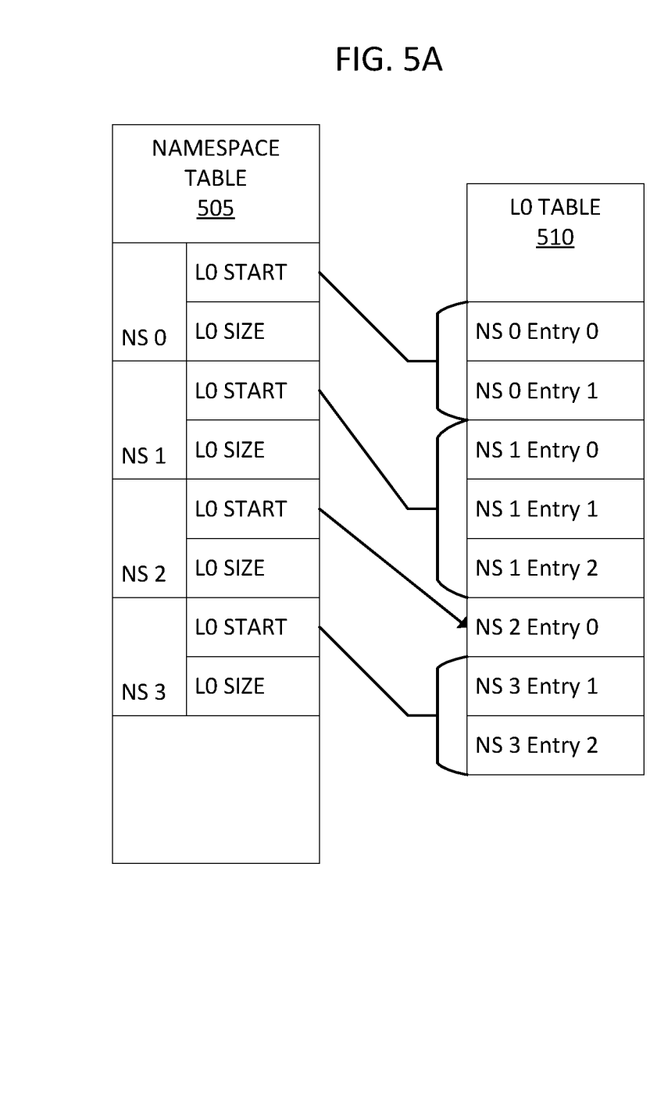
FIGS. 5A-5D illustrate examples of translation tables modified by a namespace manager in accordance with some embodiments of the present disclosure.
Figure 5B:
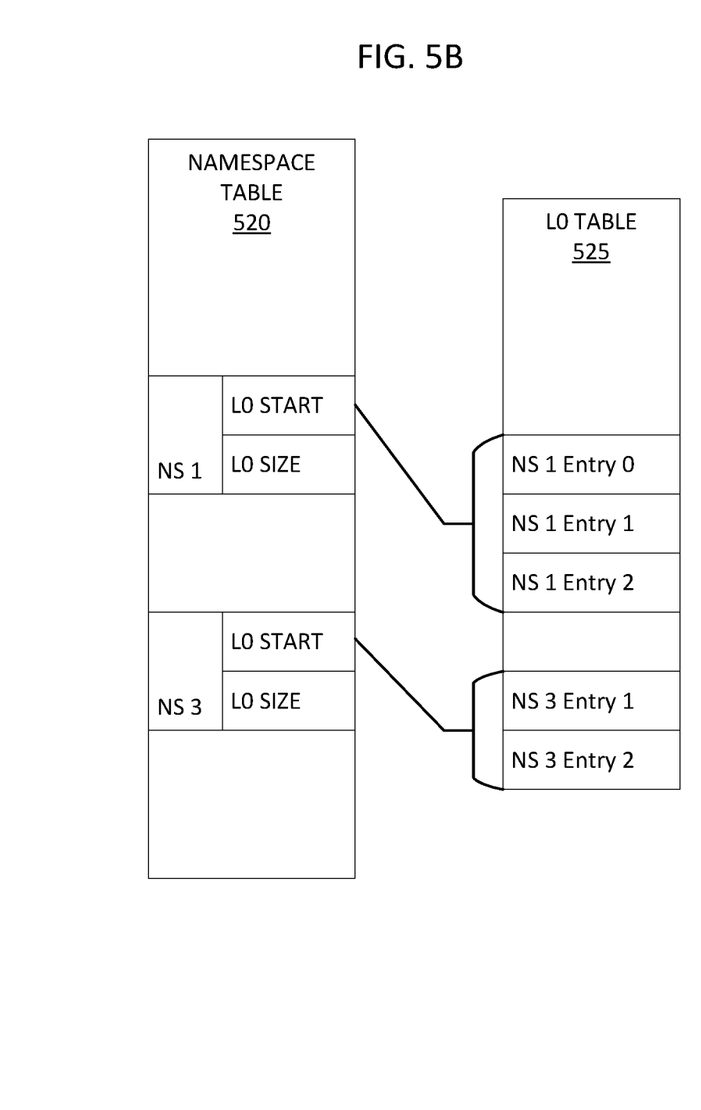
Figure 5C:
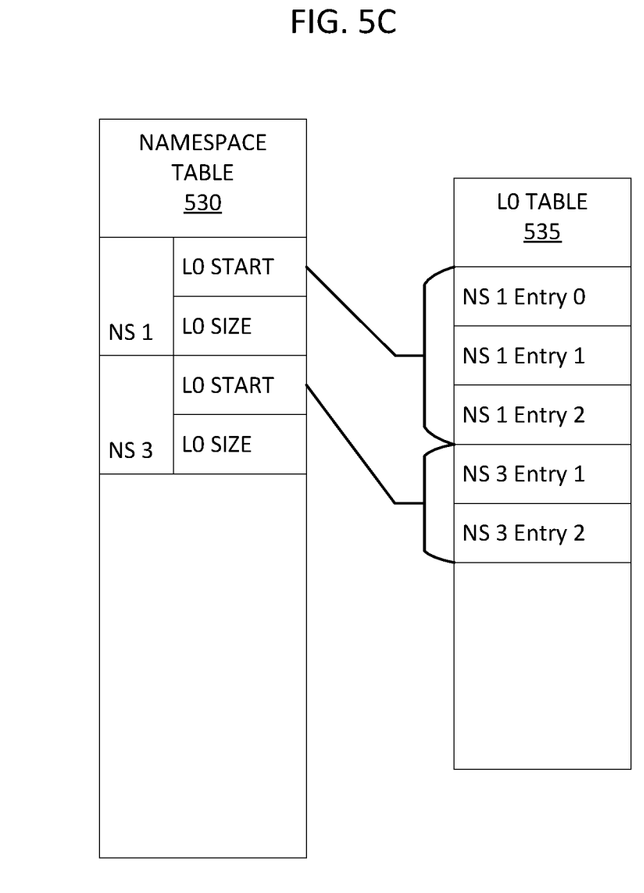
Figure 5D:
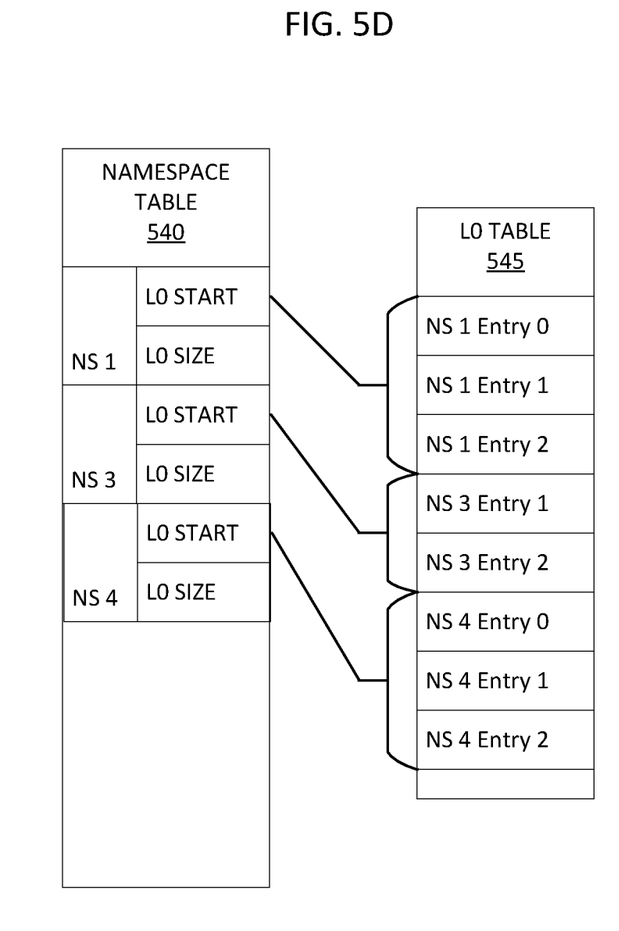

FIGS. 5A-5D illustrate examples of translation tables modified by a namespace manager in accordance with some embodiments of the present disclosure. In one embodiment, the namespace manager enables the host to modify namespaces during runtime. Modifications can include creating/allocating, deleting/deallocating, and resizing namespaces. In one embodiment, resizing a namespace includes deleting the namespace and creating the namespace with the new size. Referring to the illustrated example in FIG. 5A, namespace table 505 and L0 table 510 illustrate a memory subsystem currently managing four namespaces with identifiers NS 0, NS 1, NS 2, and NS 3. The processing device can receive a request from the host during runtime to delete or deallocate one or more namespaces. In response to such a request, the namespace manager deletes the corresponding entry/entries in the namespace table 505 and L0 table. For example, as shown in FIG. 5B, namespace table 520 and L0 table 525 illustrate namespace table 505 and L0 table 510 after processing device deletes namespaces 0 and 2. In one embodiment, upon deletion, the namespace manager rearranges the remaining table entries. For example, the namespace manager can read entries from their current table locations and write them to new locations. In one embodiment, upon deletion of a namespace, the corresponding entries in the L1 table (e.g., L1 table 215 in FIG. 2) are released for reuse (e.g., in the creation of a new namespace). As shown in FIG. 5C, namespace table 530 and L0 table 535 illustrate namespace table 520 and L0 table 525 after the processing device moves the remaining namespaces and L0 entries up in their respective tables. As another example of a modification, the namespace manager can receive a request to add a namespace during runtime. In response to such a request, the namespace manager creates a new entry in the namespace table with a pointer to the end/next available entry in the L0 table. As shown in FIG. 5D, namespace table 540 and L0 table 545 illustrate namespace table 530 and L0 table 535 after the processing device inserts a new namespace 4 and assigns three L0 table entries to the new namespace 4.

Figure 6:
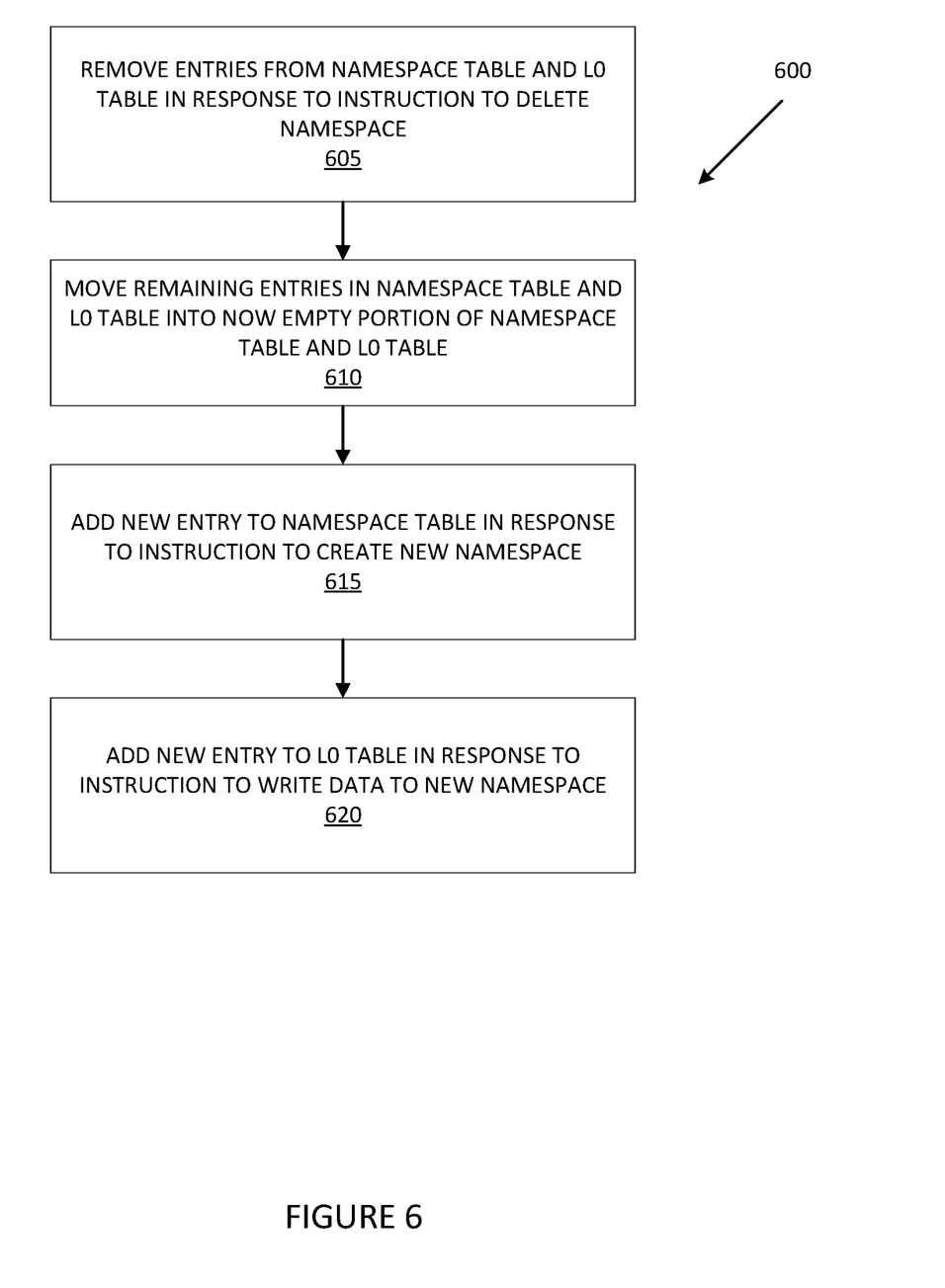
FIG. 6 is a flow diagram of an example method of managing namespaces in accordance with some embodiments of the present disclosure.

FIG. 6 is a flow diagram of an example method 600 to manage namespaces, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by using namespace manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 605, the processing device removes entries from the namespace table and the L0 table in response to an instruction to delete a namespace. An example of this is illustrated in FIGS. 5A and 5B. In one embodiment, the instruction to delete the namespace comes from a host process executing on host system 120.

At block 610, the processing device moves remaining entries in the namespace table and the L0 table into the now-empty portion of the namespace table and the L0 table. An example of this is illustrated in FIGS. 5B and 5C.

At block 615, the processing device adds a new entry to the namespace table in response to an instruction to create a new namespace. An example of this is illustrated in FIG. 5D. In one embodiment, the instruction is received from a process executing on host system 120.

At block 620, the processing device adds one or more new entries to the L0 table in response to an instruction to write data to a new namespace. In one embodiment, entries to the L0 table are assigned to a namespace as the storage is used: for example, when host system 120 sends a write instruction to memory subsystem 110 that includes a logical block address (i.e., an offset into the new namespace). In another embodiment, the processing device assigns L0 table entries when the processing device creates the new namespace. An example of this is illustrated in FIG. 5D.

Figure 7:
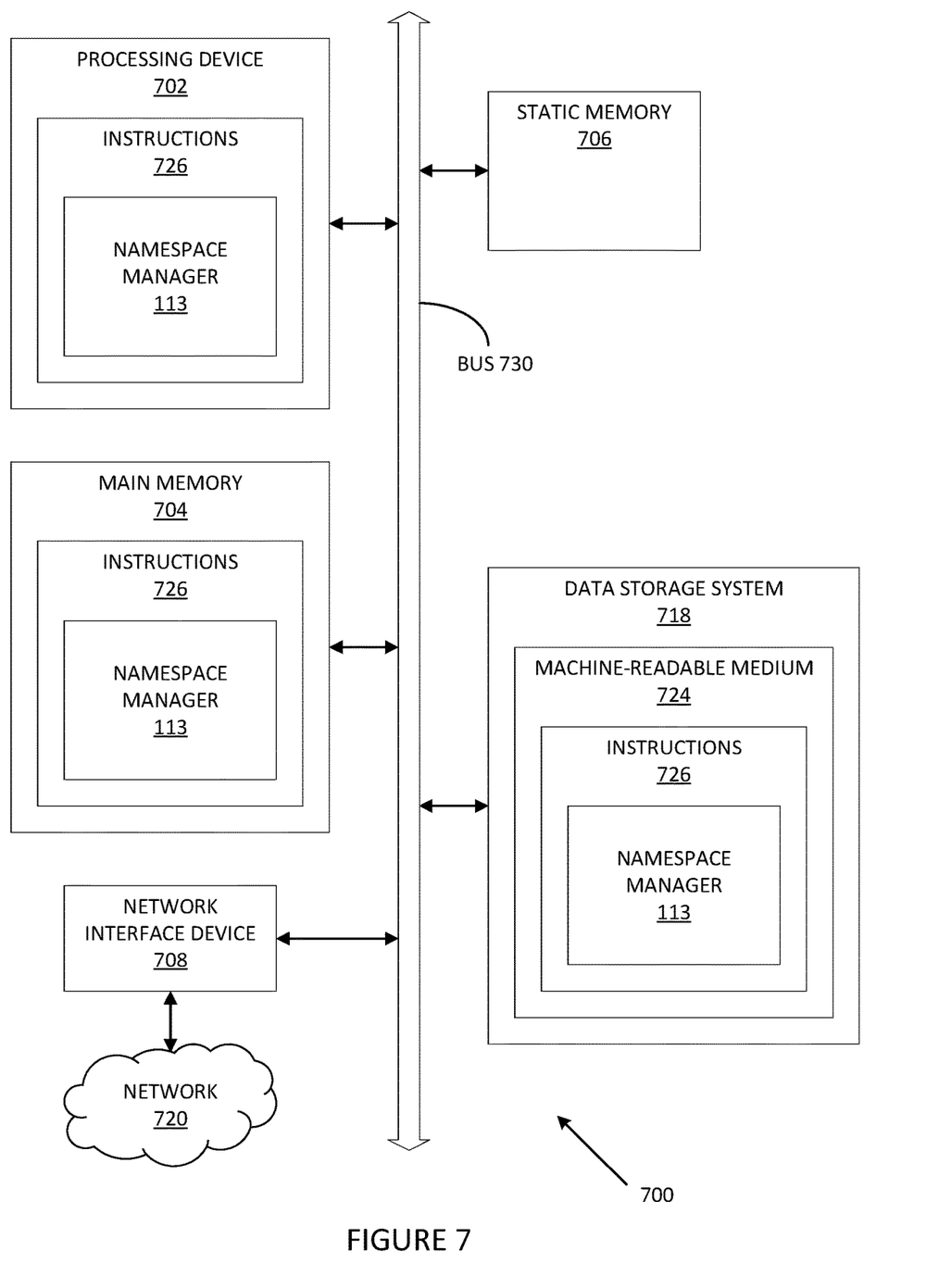
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the namespace manager 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus® DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory subsystem 110 of FIG. 1.

In one embodiment, the instructions 726 include instructions to implement functionality corresponding to maintaining and using a namespace table (e.g., the namespace manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus, for example, the computing environment 100 of FIG. 1, for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented methods 300 and 400 in response to its processor executing a computer program (e.g., a sequence of instructions) contained in a memory or other non-transitory machine-readable (e.g., computer-readable) storage medium. Such a computer program can be stored in a computer readable storage medium, such as, but not limited to, any type of disk including floppy disks, optical disks, compact disc-read only memories (CD-ROMs), and magneto-optical disks, read-only memories (ROMs), random access memories (RAMs), erasable programmable read only memories (EPROMs), EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description herein. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer-implemented method comprising:
receiving a first read instruction from a host process, wherein the first read instruction includes a first namespace offset;
generating a first logical address by combining a namespace identifier for the namespace assigned to the host process and the first namespace offset;
translating the first logical address to a first physical address using a plurality of hierarchical tables;
generating a second read instruction, wherein the second read instruction includes the first physical address and the first logical address; and
sending the second read instruction to a memory component, wherein the memory component validates the translation of the first logical address by comparing the first logical address in the second read instruction to metadata associated with data to be read at the first physical address.

2. The method of claim 1, further comprising:
identifying the namespace identifier for a namespace associated with a first write instruction received from the host process, wherein the first write instruction includes data and a second namespace offset;
generating a second logical address by combining the namespace identifier and the second namespace offset;
translating the second logical address to a second physical address using a plurality of hierarchical tables;
generating a second write instruction, wherein the second write instruction includes the data, the second physical address, and the second logical address; and
sending the second write instruction to the memory component, wherein the memory component stores the data at the first physical address and wherein the memory component stores the first logical address, including the namespace identifier, as metadata associated with the data.

3. The method of claim 1, wherein the plurality of hierarchical tables includes a namespace table and one or more translation tables.

4. The method of claim 3, wherein the namespace table includes one or more namespace entries and wherein each namespace entry includes a starting location in a first translation table in the one or more translation tables and a size of the namespace in the first translation table.

5. The method of claim 3, wherein translating the first logical address includes locating an entry in the namespace table using the namespace identifier.

6. The method of claim 1, wherein combining the namespace identifier and the first namespace offset includes appending the first namespace offset to the namespace identifier.

7. The method of claim 1, wherein the metadata is stored in a reserved portion of the memory component associated with the first physical address.

8. A non-transitory computer-readable storage medium comprising instructions that, when executed by a processing device, cause the processing device to:
receive a first read instruction from a host process, wherein the first read instruction includes a first namespace offset;
generate a first logical address by combining a namespace identifier for the namespace assigned to the host process and the first namespace offset;
translate the first logical address to a first physical address using a plurality of hierarchical tables;
generate a second read instruction, wherein the second read instruction includes the first physical address and the first logical address; and
send the second read instruction to a memory component, wherein the memory component validates the translation of the first logical address by comparing the first logical address in the second read instruction to metadata associated with data to be read at the first physical address.

9. The non-transitory computer-readable storage medium of claim 8, wherein the instructions, when executed, cause the processing device further to:
identify the namespace identifier for a namespace associated with a first write instruction received from the host process, wherein the first write instruction includes data and a second namespace offset;
generate a second logical address by combining the namespace identifier and the second namespace offset;
translate the second logical address to a second physical address using a plurality of hierarchical tables;
generate a second write instruction, wherein the second write instruction includes the data, the second physical address, and the second logical address; and
send the second write instruction to the memory component, wherein the memory component stores the data at the first physical address and wherein the memory component stores the first logical address, including the namespace identifier, as metadata associated with the data.

10. The non-transitory computer-readable storage medium of claim 8, wherein the plurality of hierarchical tables includes a namespace table and one or more translation tables.

11. The non-transitory computer-readable storage medium of claim 10, wherein the namespace table includes one or more namespace entries and wherein each namespace entry includes a starting location in a first translation table in the one or more translation tables and a size of the namespace in the first translation table.

12. The non-transitory computer-readable storage medium of claim 10, wherein translating the first logical address includes locating an entry in the namespace table using the namespace identifier.

13. The non-transitory computer-readable storage medium of claim 8, wherein combining the namespace identifier and the first namespace offset includes appending the first namespace offset to the namespace identifier.

14. The non-transitory computer-readable storage medium of claim 8, wherein the metadata is stored in a reserved portion of the memory component associated with the first physical address.

15. A system comprising:
a memory component; and
a processing device, coupled to the memory component, configured to:
receive a first read instruction from a host process, wherein the first read instruction includes a first namespace offset;
generate a first logical address by combining a namespace identifier for the namespace assigned to the host process and the first namespace offset;
translate the first logical address to a first physical address using a plurality of hierarchical tables, wherein the plurality of hierarchical tables includes a namespace table and one or more translation tables;
generate a second read instruction, wherein the second read instruction includes the first physical address and the first logical address; and
send the second read instruction to a memory component, wherein the memory component validates the translation of the first logical address by comparing the first logical address in the second read instruction to metadata associated with data to be read at the first physical address.

16. The system of claim 15, wherein the processing device is further configured to:

identify the namespace identifier for a namespace associated with a first write instruction received from the host process, wherein the first write instruction includes data and a second namespace offset;
generate a second logical address by combining the namespace identifier and the second namespace offset;
translate the second logical address to a second physical address using a plurality of hierarchical tables;
generate a second write instruction, wherein the second write instruction includes the data, the second physical address, and the second logical address; and
send the second write instruction to the memory component, wherein the memory component stores the data at the first physical address and wherein the memory component stores the first logical address, including the namespace identifier, as metadata associated with the data.

17. The system of claim 15, wherein the namespace table includes one or more namespace entries and wherein each namespace entry includes a starting location in a first translation table in the one or more translation tables and a size of the namespace in the first translation table.

18. The system of claim 15, wherein combining the namespace identifier and the first namespace offset includes appending the first namespace offset to the namespace identifier.

19. The system of claim 15, wherein translating the first logical address includes locating an entry in the namespace table using the namespace identifier.

20. The system of claim 15, wherein the metadata is stored in a reserved portion of the memory component associated with the first physical address.

* * * * *